March 16, 1926.
B. E. TAYLOR
1,576,876
AUTOMOBILE DOORLOCK
Filed Jan. 15, 1923     3 Sheets-Sheet 3
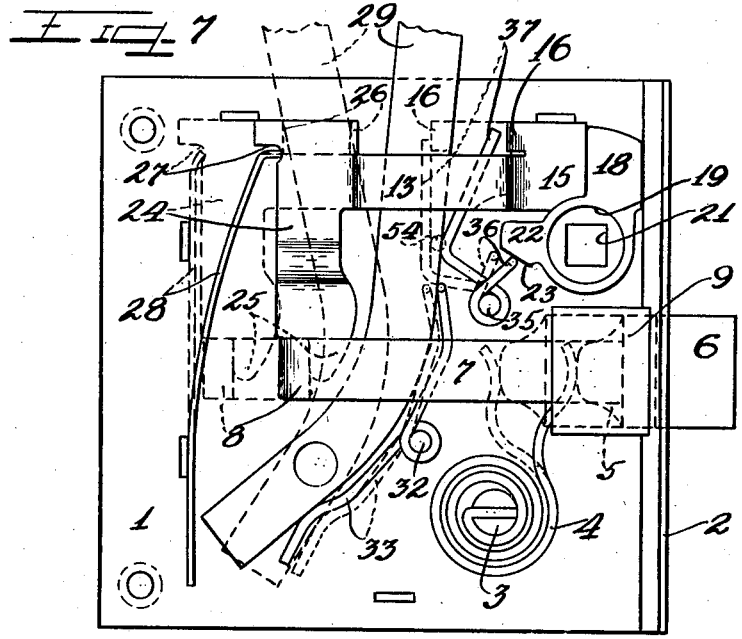
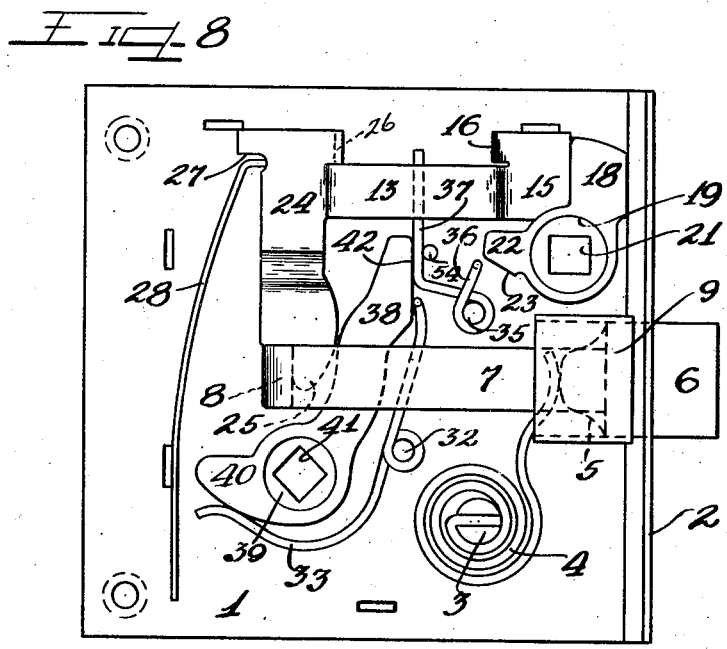
Witnesses
Inventor
BAYARD E. TAYLOR
by
Atty.

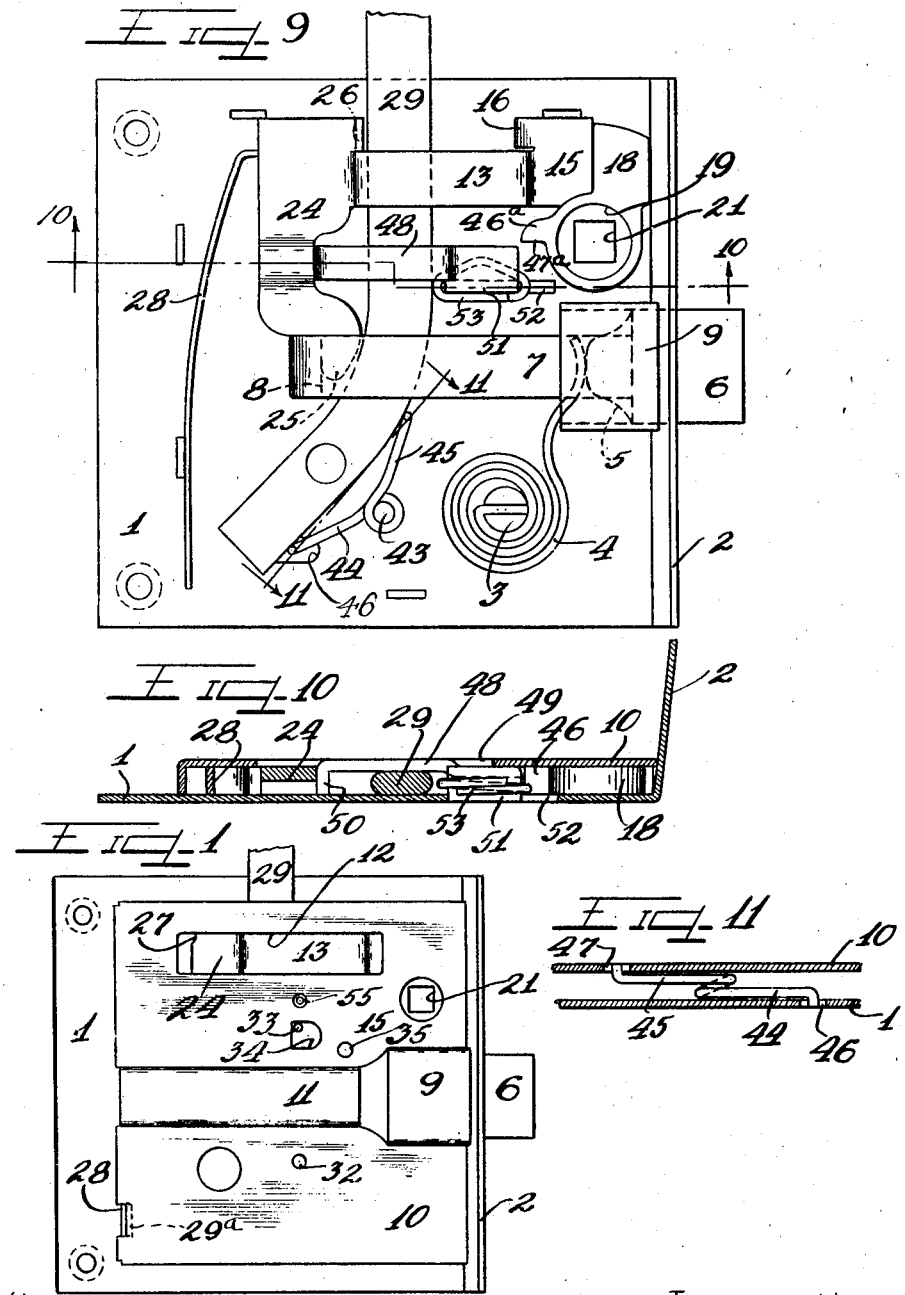

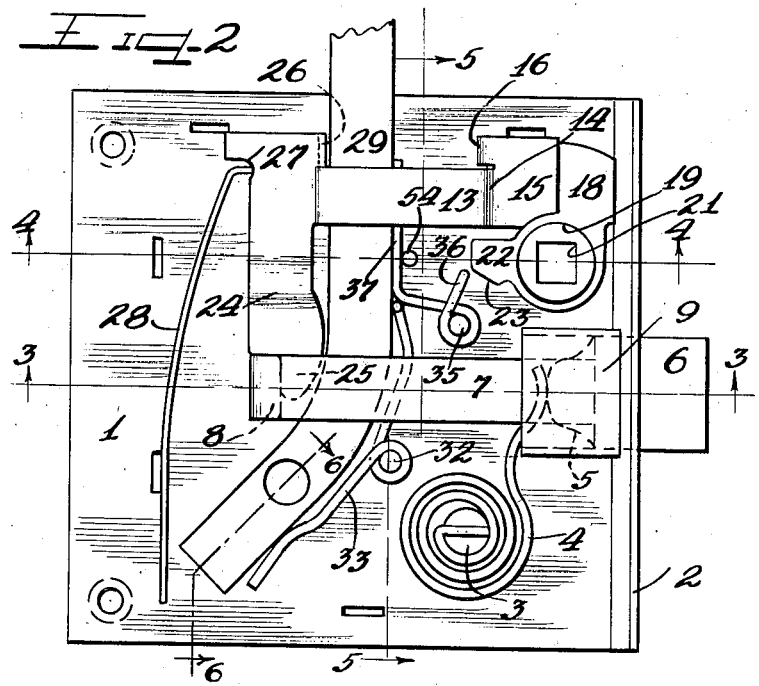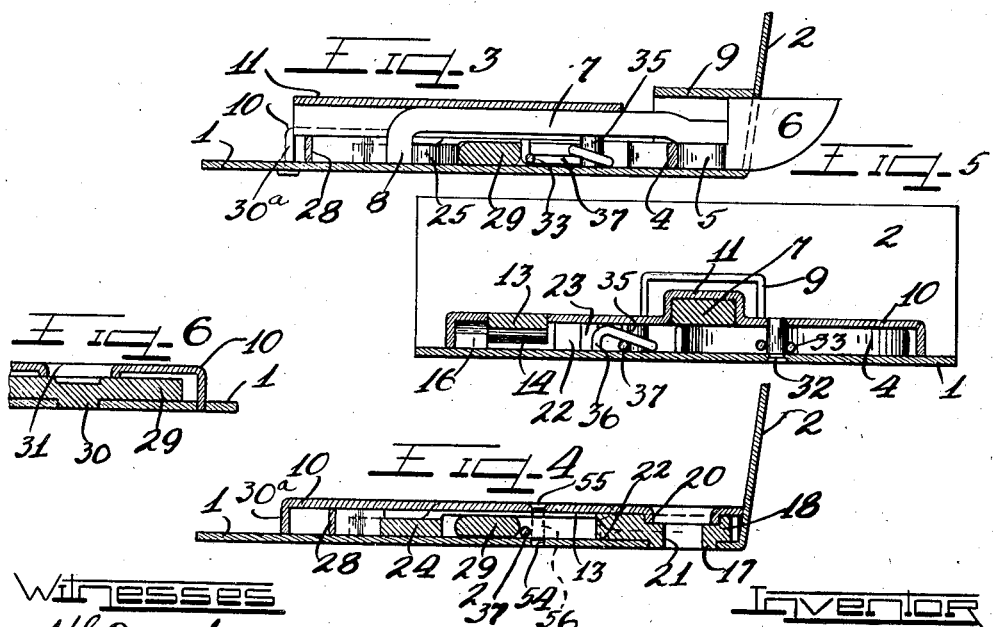

Patented Mar. 16, 1926.

1,576,876

UNITED STATES PATENT OFFICE.

BAYARD E. TAYLOR, OF OAK PARK, ILLINOIS.

AUTOMOBILE DOORLOCK.

Application filed January 15, 1923. Serial No. 612,613.

*To all whom it may concern:*

Be it known that I, BAYARD E. TAYLOR, a citizen of the United States, and a resident of the village of Oak Park, in the county of Cook and State of Illinois, have invented certain new and useful Improvements in an Automobile Doorlock; and I do hereby declare that the following is a full, clear, and exact description of the same, reference being had to the accompanying drawings, and to the numerals of reference marked thereon, which form a part of this specification.

Persons driving closed automobiles of the sedan or coupé types find it necessary when leaving their cars to lock the doors thereof to prevent unauthorized persons from entering the cars. In such cases, each of the automobile doors must be locked from either the interior of the automobile or from the exterior thereof by key operated locks or by locking attachments which, when moved into locking position, are releasable from the exterior of the automobile by the use of keys.

This invention relates more particularly to automobile door locks adapted to be locked and unlocked from the interior of the automobile without the use of a key by merely operating the inner handle of the door lock, thereby affording a door lock with which all but one of the doors of a closed automobile may be equipped to permit said doors to be locked and unlocked only from the interior of the automobile, while the remaining door may be equipped with a door lock of a type similar to the other door locks with the exception that means is provided for locking the locking member of the remaining door lock and equipping said remaining door with an externally operable key lock mechanism.

It is an object of this invention to provide an automobile door lock adapted to be locked against operation by means of one of the lock operating handles.

It is also an object of this invention to provide an automobile door lock adapted to be locked against operation and also unlocked by the operation of one of the lock operating handles.

Another object of the invention is to provide a vehicle door lock wherein the inner handle is adapted to be operated to not only retract the latch bolt but to also actuate a locking means for locking the outer handle against operation.

It is a further object of this invention to provide a vehicle door lock wherein one of the latch bolt retracting handles is adapted to be locked and unlocked by the operation of the other handle without locking said other handle against a bolt retracting operation.

It is furthermore an object of this invention to provide a vehicle door lock wherein the inner and outer handles are each provided with separate springs for holding the same in inoperative or normal positions when the latch bolt is projected.

Still another object of the invention is to provide a vehicle door lock wherein a locking member is adapted to be moved into locking engagement with the outer handle roll back when the inner handle is operated in one direction, and is adapted to be moved into release position by a slide to unlock the outer handle roll back when the inner handle is operated in a reverse direction to actuate said slide to cause retraction of the vehicle door lock latch bolt.

A further object of the invention is to provide a vehicle door lock wherein one of the handles of a vehicle door lock is adapted to be operated to simultaneously cause retraction of a latch bolt and release of a locking member holding the other handle locked.

It is also an object of this invention to construct a comparatively thin vehicle door lock wherein an inner handle is provided with a separate spring for holding and returning the same into an inoperative position independently of a spring which acts on a slide member to hold the outer handle in an inoperative position.

It is another object of this invention to provide a door lock with a locking member adapted to be operated by one handle to lock the other handle, said door lock adapted to be provided with means for locking said locking member so that said first-mentioned handle cannot be locked by the other handle.

It is an important object of this invention to provide a vehicle door lock of comparatively thin and inexpensive construction adapted to lock and unlock the outer handle from the inside of the vehicle by simply operating the inner handle in opposite directions from a normal position, Other and further important objects of this invention will be apparent from the disclosures in the specification and the accompanying drawings.

The invention (in a preferred form) is illustrated in the drawings and hereinafter more fully described.

On the drawings:

Figure 1 is a plan view of an automobile door lock embodying the principles of this invention.

Figure 2 is a plan view of the lock with the casing removed.

Figure 3 is a section taken on line 3—3 of Figure 2 with parts in elevation.

Figure 4 is a section taken on line 4—4 of Figure 2.

Figure 5 is a section taken on line 5—5 of Figure 2.

Figure 6 is a fragmentary detail section taken on line 6—6 of Figure 2.

Figure 7 is a plan view of the lock with the cover removed and illustrating the operation in dotted lines.

Figure 8 is a plan view of a modified form of lock with the casing removed.

Figure 9 is a plan view of another modified form of the lock with the casing removed.

Figure 10 is a section taken on line 10—10 of Figure 9 with parts shown in elevation.

Figure 11 is a fragmentary detail section taken on line 11—11 of Figure 9.

As shown on the drawings:

The type of vehicle door lock illustrated in Figures 1 to 7 inclusive comprises a mounting plate or back plate 1, one end of which is bent at an angle to afford a flange 2 having a latch bolt opening therein. Secured in a split boss or stud 3 formed on the mounting plate 1 is the inner end of a heavy coiled spring 4, the outer end of which projects to engage against a heel or projection 5 formed on a latch bolt head 6 positioned to project through the opening in the mounting plate flange 2. Rigidly secured to the latch bolt head 6 by soldering or other suitable means, is a latch bolt shank or stem 7, the inner end of which is bent to form a finger or flange 8 which is in slidable contact with the mounting plate 1. Rigidly secured to the mounting plate 1 against the inner surface of the mounting plate flange 2 is a U-shaped strap 9 which affords a guide for the latch bolt head 6.

A cover or casing 10 is secured to the mounting plate 1 to enclose the operating mechanisms of the lock. The casing 10 is formed with a projecting channel 11 which afford a guide for the latch bolt shank 7. The casing 10 is provided with a guide slot 12 in which a slide bar 13 is adapted to slide. One end of the slide bar 13 is deflected at 14 and has integrally formed thereon a head 15 provided with a lug 16 which has sliding contact with the mounting plate 1.

Rotatable in an opening in the mounting plate 1 is a boss 17 of a roll back 18 positioned to coact with the slide bar head 15. The roll back boss 17 is formed by partially pressing out a portion thereof leaving a recess 19 into which a circular flange 20 struck from the casing 10 projects. The roll back and boss are provided with a square opening 21 for receiving the squared inner end of a stem of an outer handle (not shown). Integrally formed on the roll back is an arm 22 provided with an inclined edge 23.

Integrally formed on the other deflected end of the slide bar 13 is a transverse arm 24 on one end of which a finger or lug 25 is formed to engage back of the latch bolt flange 8. The other end of the arm 24 is provided with a lug at 26. A notch 27 is formed in the edge of the slide bar arm 24 to receive one end of a leaf spring 28. The other end of the leaf spring 28 projects between a casing lug 29$^a$ and one side wall 30$^a$ of said casing. The leaf spring 28 acts to resiliently hold the head 15 of the slide bar 13 in contact with the roll back 18 to hold the roll back and the outer handle in inoperative position.

The lock is provided with an inner lever or handle 29 which is disposed between the mounting plate 1 and the slide bar 13 with the inner curved end of said handle projecting behind the latch bolt shank 7. A boss 30 is partially struck from said handle and seats in an opening in the mounting plate 1 to afford a pivotal mounting for the handle. The casing 10 has struck inwardly therefrom a circular flange 31 which contacts the curved end of the handle 29 to hold the handle from rattling. A pin 32 is fixed on the mounting plate 1 a little above and to one side of the pivot boss 30 of the handle 29. Coiled around the pin 32 is a spring 33, one end of which is directed to frictionally engage the lower end of the handle 29 below the pivot point thereof. The other end of the spring 33 projects behind the latch bolt and has the end thereof bent at right angles to project through an opening 34 in the lock casing 10. The spring 33 acts to hold the inner handle 29 in a vertical or normal inoperative position as illustrated in Figure 2.

A locking mechanism is provided for the purpose of locking the roll back 18 against operation by the outer handle. Fixed on the mounting plate 1 is a pin 35 on which is pivotally engaged a stop or locking member comprising a short arm 36 and a long arm 37. The ends of the locking member arms 36 and 37 are bent toward the mounting plate 1 for respective co-action with the roll back arm 22 and the inner handle 29. When in normal unlocked position the short arm 36 of the locking member is positioned out of the field of operation of the roll back arm 22, and the long arm 37 of the locking member is positioned adjacent one edge of the inner handle 29 as illustrated in Figure 2.

Figure 8 illustrates a modified form of automobile door lock similar in construction to the lock shown in Figure 7 with the exception that the lever type handle 29 is replaced by a roll back handle mechanism. The parts of the lock which are the same as parts illustrated in Figure 7 are given corresponding reference numerals. In this form of the device the lever type handle 29 is replaced by an inner handle roll back 38 having a depressed portion 39 which is rotatably engaged in an opening in the mounting plate 1. An arm 40 is integrally formed in the pivoted end of the inner handle roll back 38. One end of the spring 33 is frictionally engaged against the edge of the roll back arm 40, while the other end of the spring 33 is bent at right angles and projects through the casing opening 34. The spring 33 serves to hold the inner handle roll back 38 positioned in a normal or inoperative position, while the leaf spring 28 acts to hold the outer handle roll back 18 in a normal or inoperative position. The inner handle roll back 38 is provided with a square opening 41 to receive the squared stem of an inner handle (not shown). The locking member 36—37, when in release position as shown in Figure 8, has the long arm 37 thereof positioned adjacent a straight edge 42 of the roll back 38.

Figures 9, 10 and 11 illustrate another modified form of door lock wherein a number of the parts are similar in form to those shown in Figure 2 and are numbered correspondingly. A pin 43 is secured on the mounting plate 1 adjacent the pivot point for the inner handle 29 and engaged on said pin is the looped middle portion of a spring, the arms 44 and 45 of which are directed in opposite directions and have the ends thereof bent to respectively project through openings 46 and 47 provided in the mounting plate 1 and in the casing 10. The spring arm 44 presses against the handle 29 below the pivot point thereof, while the spring arm 45 presses against the handle 29 above the pivot point thereof. The spring 44—45 serves to hold the handle 29 in its vertical normal inoperative position as illustrated in Figure 9. It will be noted that the outer handle roll back 18 is provided with an integral arm or lug 46* having a straight edge 47* positioned horizontally when the roll back 18 is in inoperative position.

For the purpose of locking the roll back 18 against operation by the outer handle, a locking mechanism is provided comprising a locking bar 48 slidable in a guide slot 49 provided in the casing 10 (Figure 10). One end of the locking bar 48 is bent at an angle to afford a lug or flange 50. Integrally formed on one side of the other deflected end of the locking bar 48 is a flange 51 which projects into a guide slot 52 provided in the mounting plate 1. A spring 53 is coiled around the locking bar flange 51 and serves to hold the deflected end of the locking bar resiliently pressed against the inner surface of the casing 10 to hold the locking bar against rattling.

In order that the forth or exit door of an automobile may be locked from the exterior of the automobile by means of a key operated lock and be equipped with a door lock similar in construction to the door locks used on the other doors of the automobile, as illustrated in Figures 7 and 8, it is necessary to lock the locking member 36—37 against operation by the inner handle mechanism. For this reason the door lock mounting plate 1 is provided with a threaded aperture 54 disposed directly below an opening 55 in the door lock casing 10 (Figure 4). A screw or pin 56 (Figure 4) is adapted to be engaged through the casing opening 55 and threaded into the mounting plate opening 54 adjacent the long locking member arm 37 to hold the locking member locked in release position against actuation by the inner handle mechanism. The locking screw 56, while locking the locking member 36—37 against operation, permits retraction of the latch bolt by the operation of either the outer handle roll back or the inner handle mechanism. The last door of the vehicle may be equipped with an independent key operated lock whereby the last door of the automobile may be locked and unlocked from the exterior of the automobile. It will be noted that all the doors of an automobile may be equipped with the improved type of door lock and that the lock of only one of said doors need be provided with the locking screw or pin 56.

The operation is as follows:

In the form of door lock illustrated in Figures 1 to 7 inclusive, the main spring 4 presses against the latch bolt and acts to normally hold the latch bolt head 6 in its projected latching position. The lock is adapted to be mounted in a vehicle door in the usual manner to permit the projecting latch bolt to project into an opening in a door frame strike plate to hold the door rigidly in place in the door frame.

When the door is closed the second spring 28 acts to hold the head 15 of the slide bar 13 projected against the outer handle roll back 18 to hold the same in normal inoperative position. The third spring 33 acts on the inner handle 29 to hold the same in a vertical normal position with the long arm 37 of the locking member positioned adjacent the handle 29.

With the lock member 36—37 in release position as shown in Figure 2, the closed door may be readily opened from the exterior of the vehicle by simply turning the outer handle thereby rotating the roll back 18 to cause the same to move the slide bar 13 against the action of the spring 28. Movement of the slide bar causes the finger 25 thereon to act on the latch bolt flange 8 to retract the latch bolt against the action of the main spring 4. With the latch bolt retracted the door may be swung into open position. Release of the outer handle permits the stressed springs 4 and 28 to return the latch bolt and the slide bar back into normal position. Return of the slide bar to normal position returns the roll back 18 and the outer handle to their normal positions.

When the outer handle is operated to cause retraction of the latch bolt the inner handle remains undisturbed in its vertical normal position. The door when closed may also be opened from the interior of the automobile. This is done by swinging the inner handle 29 into the dotted line position in Figure 7, thereby causing said handle to engage against the slide bar lug 26 to move the slide bar against the action of the second spring 28. Such movement of the slide bar causes the finger 25 to act on the latch bolt flange 8 to draw the latch bolt inwardly against the action of the main spring 4. When the inner handle 29 is operated to retract the latch bolt the outer handle and its roll back 18 are undisturbed. With the release of the inner handle after the opening of the door, the third spring 33 acts to return the inner handle 29 to its normal vertical position as shown in Figure 2, while the second spring 28 serves to push the slide bar 13 back into its normal position against the roll back 18.

The door lock is constructed to permit the outer door handle to be locked against operation by locking the outer door roll back 18. The roll back 18 may be locked either when the door is closed or when it is open. To lock the roll back 18 the inner handle 29 operates about its pivot point and is moved from its vertical normal position (Figure 2) into the full line position of Figure 7. This movement of the inner handle throws the locking member 36—37 about its pivot pin 35 from the dotted line position of Figure 7 into the full line position of said figure, thereby positioning the bent-over end of the short arm 36 of the locking member against the inclined edge 23 of the roll back arm 22. The end of the long arm 37 of the locking member is positioned adjacent the slide bar lug 16. In the above-mentioned locking position of the locking member the outer handle roll back 18 and the outer handle are locked against operation, leaving the inner handle 29 free to be operated. When the inner handle 29 is moved into the full line position of Figure 7 to lock the roll back 18, the inner handle control spring 33 is moved from the position illustrated in Figure 2 into the full line position of Figure 7, such movement of the upper end of said spring 33 being limited by the length of the casing slot 34 through which the end of said spring projects. Upon release of the inner handle 29 after a locking operation, the stressed spring 33 acts automatically to return said handle to its normal vertical position (Figure 2), leaving the locking member 36—37 in its locking position to prevent operation of the roll back 18 by the outer handle of the door lock.

Should the outer handle be locked while the door is open, the door may be pushed shut since the latch bolt 6 is free to operate even when the roll back 18 is locked. It will be noted that the outer handle mechanism may be locked against operation by simply throwing the inner handle 29 to one side of its normal position without necessitating locking of said inner handle, thereby affording a novel arrangement whereby the inner handle 29 may be moved from the inner side of the door into the dotted line latch bolt retracting position of Figure 7 to retract the latch bolt when the outer handle mechanism is locked.

Attention is called to the fact that when the outer handle mechanism is locked against operation and the inner handle 29 is moved into the dotted line position of Figure 7 to retract the latch bolt to permit opening of the door from the interior of the automobile, the lug 16 on the slide member 13 acts against the end of the long arm 37 of the locking member to move said locking member back into release or unlocking position as shown in dotted lines (Figure 7), thereby simultaneously causing unlocking of the outer handle mechanism with the retraction of the latch bolt by the operation of the inner handle 29.

In this type of door lock it will be noted that the latch bolt and the inner handle are always free to be operated and that the outer handle and its roll back are the only parts which may be locked. Attention is also called to the fact that while the spring 28 acts on the slide bar 13 to return the outer handle roll back to its normal position after a retracting operation of the latch bolt by the outer handle, said spring 28 does not act to fully restore the inner handle 29 to its normal position after a latch bolt retracting operation by said inner handle, since the slide bar head 15 comes into contact with the outer handle roll back before the inner handle reaches its normal position. The inner handle is returned to its normal position by the action of the spring 33. The spring 33 also acts on the inner handle to return the same to normal position after said inner handle has been operated to move the locking member into locking position.

In case there should be a preference of a knob or crank type inner handle over the lever type of inner handle illustrated in Figures 2 and 7, a modified form of door lock is illustrated in Figure 8 wherein the lever handle 29 is replaced by an inner handle roll back 38 which is operable by means of an inner crank type of handle having a squared stem adapted to fit into the square opening 41 of the roll back 38 to permit actuation of said roll back to cause retraction of the latch bolt. With the above-mentioned change in the inner handle construction the door lock shown in Figure 8 is operated substantially the same as the type of door lock illustrated in Figure 2, the locking member 36—37 adapted to be moved into locking position by the inner handle roll back 38 instead of by the lever type inner handle 29.

In the modified type of door lock disclosed in Figures 9, 10 and 11 the latch bolt is adapted to be retracted from either side of the door by the operation of the outer handle roll back 18 or the inner handle 29. To lock the roll back 18 against operation by the outer handle, the lever 29 is thrown to the right looking at Figure 9, thereby causing the handle 29 to engage against the spring 53 on the locking bar flange 51 to cause the locking bar to be shifted into locking position beneath the roll back arm 46ª, thereby locking the roll back against operation by the outer handle but leaving the latch bolt and the inner handle free to be operated. To release the outer handle roll back 18, the inner handle 29 is simply thrown to the left, looking at Figure 9, thereby causing the inner handle to engage against the locking bar lug 50 to retract the locking bar 48 simultaneously with the retraction of the latch bolt. The inner handle is adapted to be returned into its normal position from either of its operating positions by means of the spring 44—45, the ends of which respectively project through the openings or slots 46 and 47 provided in the mounting plate 1 and the casing 10.

While a locking screw 56 is provided in the lock for the last door of an automobile, said screw 56 may be omitted and the locking member pin 35 may be replaced by a squared pin connected with the barrel of a key-operated lock to permit the locking member 36—37 of the last door lock to be moved into locking engagement with the roll back lug 22 by the inner handle mechanism when the last door is open, thereby causing said last door to be locked when closed in a manner similar to the other doors. A key is required to be inserted into the key-operated lock from the exterior of the automobile to retract the locking member 36—37 to permit opening of said last door from the exterior of the automobile.

I am aware that numerous details of construction may be varied through a wide range without departing from the principles of this invention, and I therefore do not purpose limiting the patent granted otherwise than necessitated by the prior art.

I claim as my invention:

1. In a door lock the combination with a roll back, of a sliding member adapted to be actuated thereby, a locking member for said roll back, and a handle adapted to be operated in one direction to move the locking member into locking engagement with said roll back and further adapted to be operated in an opposite direction to cause the slidable member to retract the locking member to release the roll back.

2. In a door lock the combination with a latch bolt, of a roll back, a sliding member adapted to be operated by the roll back to cause retraction of said latch bolt, a locking member, and a handle member adapted to be operated in one direction to move said locking member into locking engagement with said roll back and furthermore adapted to be operated in an opposite direction to actuate the sliding member to cause the same to simultaneously retract the latch bolt and move the locking member back into release position.

3. A vehicle door lock comprising a latch bolt, a main spring for holding the same projected into latching position, an outer handle roll back, a slide member adapted to be actuated by the roll back to cause retraction of the latch bolt, a second spring in engagement with said slide member to return the same and said roll back to normal position, a locking member, an inner handle mechanism adapted to be operated in one direction to move said locking member to lock the roll back against operation, and a third spring for returning the inner handle mechanism back into normal position, said inner handle mechanism also adapted to be operated to actuate the slide member to cause the same to simultaneously release the locking member and retract the latch bolt.

4. A vehicle door lock comprising a latch bolt, a main spring for holding the same projected into latching position, an outer handle mechanism, a slide member adapted to be actuated by the outer handle mechanism to cause retraction of the latch bolt, a second spring in engagement with said slide member to return the same and said outer handle mechanism to normal position, a locking member, an inner handle mechanism adapted to be operated in one direction to move said locking member into position to lock the outer handle mechanism against operation, a third spring for returning the inner handle mechanism back into normal position, said inner handle mechanism also adapted to be operated to actuate the slide member to cause the same to simultaneously release the locking member and retract the latch bolt, and means adapted to be inserted into the door lock for holding the locking member in release position against actuation by said inner handle member when it is desired to have a door lock wherein the outer handle mechanism cannot be locked.

5. In a door lock the combination with an outer handle mechanism, a locking means, an inner handle mechanism adapted to be operated to move the locking means into position to lock the outer handle mechanism against operation, and means for locking the locking means against operation by said inner handle mechanism.

6. In a door lock the combination with an outer handle mechanism, a locking means therefor, a latch bolt, a slidable member adapted to be actuated by the outer handle mechanism to cause retraction of the latch bolt, an inner handle mechanism adapted to be operated to move the locking means into position to lock the outer handle mechanism against operation, and means adapted to be engaged in the door lock to lock the locking means when in normal position against operation by said inner handle mechanism but permitting the inner handle mechanism or the outer handle mechanism to be operated to actuate said slidable member to cause retraction of the latch bolt.

7. In a door lock the combination with a slidable latch bolt retracting member, of a roll back adapted to be operated to actuate the retracting member, an arm formed on said roll back, a lug on said retracting member, a two arm locking member, and a handle mechanism adapted to be moved in one direction to move the locking member into locking position with one of the arms thereof in locking engagement with the roll back arm and with the other arm disposed in the path of said retracting member lug, said handle mechanism adapted to be moved in an opposite direction to actuate the retracting member to cause the lug thereon to return the locking member to release position.

In testimony whereof I have hereunto subscribed my name.

BAYARD E. TAYLOR.